(12) United States Patent
Schultz et al.

(10) Patent No.: US 9,992,463 B2
(45) Date of Patent: Jun. 5, 2018

(54) ALIGNMENTS FOR A PROJECTION SYSTEM WITH A SHAPED PROJECTION SCREEN USING ALIGNMENT CONTENT

(71) Applicant: 3M INNOVATIVE PROPERTIES COMPANY, St. Paul, MN (US)

(72) Inventors: John C Schultz, Afton, MN (US); Eric C Lobner, Woodbury, MN (US); Glenn E Casner, Woodbury, MN (US); Rolf W Biernath, Wyoming, MN (US); Quinn D Sanford, Ellsworth, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 82 days.

(21) Appl. No.: 14/775,764

(22) PCT Filed: Mar. 7, 2014

(86) PCT No.: PCT/US2014/021718
§ 371 (c)(1),
(2) Date: Sep. 14, 2015

(87) PCT Pub. No.: WO2014/159049
PCT Pub. Date: Oct. 2, 2014

(65) Prior Publication Data
US 2016/0021350 A1 Jan. 21, 2016

Related U.S. Application Data

(60) Provisional application No. 61/783,206, filed on Mar. 14, 2013.

(51) Int. Cl.
*H04N 9/31* (2006.01)
*G03B 21/14* (2006.01)
*H04N 17/04* (2006.01)

(52) U.S. Cl.
CPC ......... *H04N 9/3185* (2013.01); *H04N 9/3194* (2013.01); *H04N 17/045* (2013.01); *G03B 21/147* (2013.01)

(58) Field of Classification Search
CPC .... G03B 21/147; G03B 21/56; H04N 9/3185; H04N 9/3194; H04N 17/045
(Continued)

(56) References Cited

U.S. PATENT DOCUMENTS 5,141,790 A 8/1992 Calhoun
5,196,266 A 3/1993 Lu
(Continued)

FOREIGN PATENT DOCUMENTS

EP 0570515 11/1993
EP 0736585 10/1996
(Continued)

OTHER PUBLICATIONS

Satas, "Handbook of Pressure Sensitive Adhesives", $2^{nd}$ Ed., Von Reinhold Nostrand, New York, 1989. pp. 172-173.
(Continued)

*Primary Examiner* — Ryan Howard
(74) *Attorney, Agent, or Firm* — Emily V. Hargett

(57) ABSTRACT

A projection system capable of projection alignment includes a projector, a shaped projection screen, an image sensor, and a processing unit. The projector is configured to project a series of alignment content to the shaped projection screen. The image sensor is configured to capture a series of projected alignment content. The processing unit is electronically coupled to the image sensor and configured to receive the series of captured alignment content and determine at least part of general boundary of the shaped projection screen based on the series of captured alignment content.

15 Claims, 9 Drawing Sheets

(58) Field of Classification Search
USPC ..... 353/69, 70, 28, 74, 79, 80; 359/443–461
See application file for complete search history.

(56) References Cited

U.S. PATENT DOCUMENTS

| | | |
|---|---|---|
| 5,296,277 A | 3/1994 | Wilson |
| 5,362,516 A | 11/1994 | Wilson |
| 6,204,971 B1 | 3/2001 | Morris |
| 6,416,186 B1 | 7/2002 | Nakamura |
| 6,466,368 B1 | 10/2002 | Piepel |
| 6,535,333 B1 | 3/2003 | Piepel |
| 6,631,030 B2 | 10/2003 | Stevenson |
| 6,870,670 B2 | 3/2005 | Gehring |
| 7,923,675 B2 | 4/2011 | Tanis-Likkel |
| 8,193,480 B2 | 6/2012 | Tanis-Likkel |
| 2007/0187512 A1 | 8/2007 | Yada |
| 2008/0304018 A1* | 12/2008 | Tanis-Likkel ......... G03B 21/26 353/30 |
| 2009/0084860 A1 | 4/2009 | Walmsley |
| 2013/0222768 A1 | 8/2013 | Biernath |

FOREIGN PATENT DOCUMENTS

| | | |
|---|---|---|
| EP | 1385335 | 1/2004 |
| EP | 1508876 | 2/2005 |
| JP | 2007-148699 | 6/2007 |
| WO | WO 1994-21742 | 9/1994 |
| WO | WO 1997-01610 | 1/1997 |
| WO | WO 1998-45753 | 10/1998 |
| WO | WO 1999-50710 | 10/1999 |

OTHER PUBLICATIONS

International Search Report for PCT International Application No. PCT/US2014/021718 dated Jun. 10, 2014, 3 pages.

* cited by examiner

ALIGNMENTS FOR A PROJECTION SYSTEM WITH A SHAPED PROJECTION SCREEN USING ALIGNMENT CONTENT

CROSS REFERENCE TO RELATED APPLICATIONS

This application is a national stage filing under 35 U.S.C. 371 of PCT/US2014/021718, filed Mar. 7, 2014, which claims priority to U.S. Application No. 61/783,206, filed Mar. 14, 2013, the disclosure of which is incorporated by reference in its/their entirety herein.

TECHNICAL FIELD

The invention relates to optical systems, and more particularly, optical systems including a projection screen and a projector.

BACKGROUND

Projection display systems typically include an image source, such as a projector, and a projection screen. During operation of the projection display system, the projector typically projects an image onto the projection screen for presentation to viewers. The projection screen may provide a diffuse surface to improve the image quality seen by viewers. Projection systems may be used for advertising in malls, showrooms, and exhibitions. Rear projection systems are one such example. A rear projection system includes at least a projection device (e.g. a DLP (Digital Light Processing) projector) and a rear projection screen. The projector is configured to project content within a limited projection area, which is typically a basic shape, such as a square or rectangle.

SUMMARY

At least some aspects of the present disclosure feature a projection system capable of automatic or semiautomatic projection alignment. The projection system includes a projector, a shaped projection screen, an image sensor, and a processing unit. The projector is configured to project a series of alignment content to the shaped projection screen. The projector has a projection area on the shaped projection screen. The image sensor is configured to capture a series of projected alignment content. The processing unit is electronically coupled to the image sensor and configured to receive the series of captured alignment content and determine at least part of general boundary of the shaped projection screen based on the series of captured alignment content.

At least some aspects of the present disclosure direct to a method of automatic or semiautomatic alignment of a projection system, including the steps of: projecting a series of alignment content by a projector to a projection area on a shaped projection screen, at least part of the series of alignment images changing along a first direction, wherein at least part of the shaped projection screen is in the projection area; capturing, by an image sensor, a series of projected alignment content; and determining, by a processing system, at least part of a first border of the shaped projection screen based on the series of the captured alignment images.

BRIEF DESCRIPTION OF DRAWINGS

The accompanying drawings are incorporated in and constitute a part of this specification and, together with the description, explain the advantages and principles of the invention. In the drawings.

DETAILED DESCRIPTION

Figure 1A:
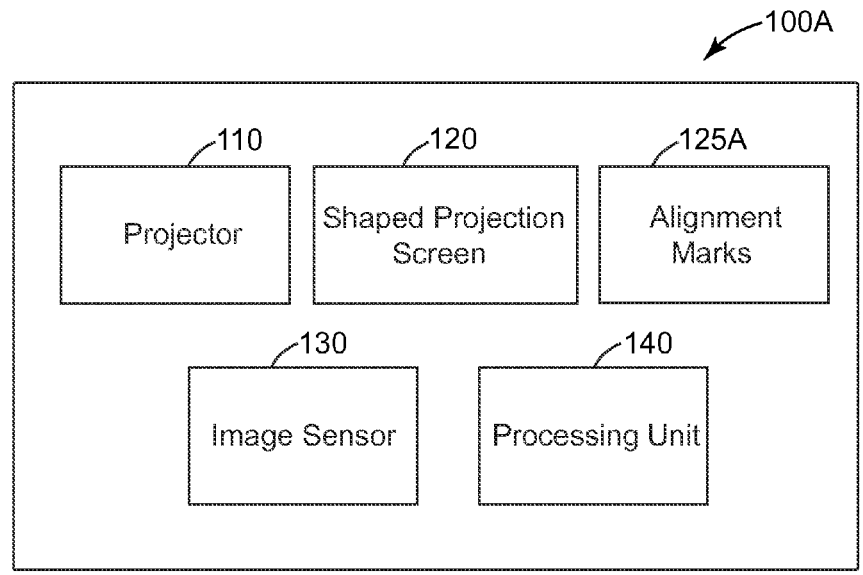
FIG. 1A illustrates a block diagram of an exemplary embodiment of a projection system capable of automatic or semiautomatic projection alignment.

A projection system typically includes a projector and a projection screen. The position of a projection screen relative to a projector as well as angle of incidence from the projector onto the projection screen affects how content looks to the viewer. For example, it can affect image alignment with the screen and cause keystone distortion of the image. The present disclosure provides methods and systems for determining relative locations, orientations, distortions, and/or other projection characteristics of a projector to a projector screen. In some cases, the projection system can apply projective transformation and/or alignment factors to adjust content to match the projection screen location and shape. Alignment factors include, for example, perspective projection factors (e.g., scale factor, location compensation factor, rotation compensation factor, orientation compensation factor, etc.), supplemental projection factors, aspect ratio factors, flipping factors (i.e., a factor used when a reflector/mirror is used in the projection system). Projective transformation refers to an image transformation (i.e., using transformational matrix or formula) to adjust presentation content to match the projection screen. At least some embodiments of the present disclosure direct to methods and systems to aid the positioning and specify configurations of a projection screen and/or a projector. In some embodiments, the projection screen is a shaped project screen, which refers to a projection screen that is not in the shape of a rectangle.

Some embodiments of the present disclosure direct to a projection system that determines the position and shape of the projection screen relative to the projector using one or more image sensors so that the system could reshape or position the projected content within the projection area in such a way as to ensure that the projected content falls on the projection screen. In some implementations, such a system could include setting all pixels of the projected image that have been determined not to fall within the projection area to black or other color that is less visible depending on the material and/or color of the projection screen. This can minimize the visibility of such pixels.

In some embodiments, a projection system may include alignment marks, also referred to as fiducials, fiducial marks, or alignment fiducials, to aid the determination of the relative position, orientation, and/or other projection characteristics of a projector to a projection screen. In some other embodiments, a projection system may use a series of alignment content to aid the determination of the relative position, orientation, and/or other projection characteristics of a projector to a projection screen. In yet other embodiments, a projection system may use both alignment marks and a series of alignment content to aid the determination of the relative position, orientation, and/or other projection characteristics of a projector to a projection screen.

Figure 2A:
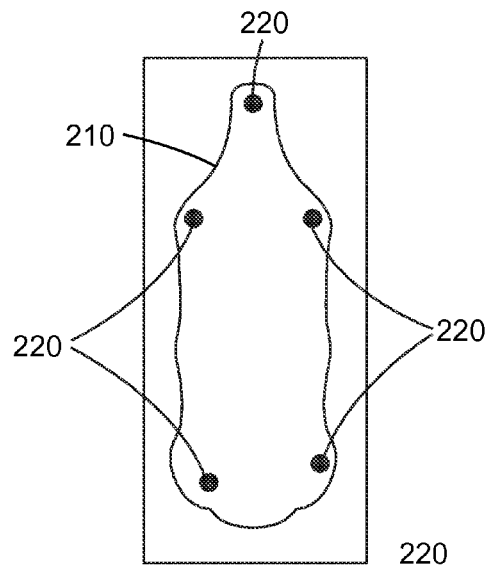
FIGS. 2A-2D illustrate exemplary configurations of a shaped projections screen with alignment marks.
Figure 2B:
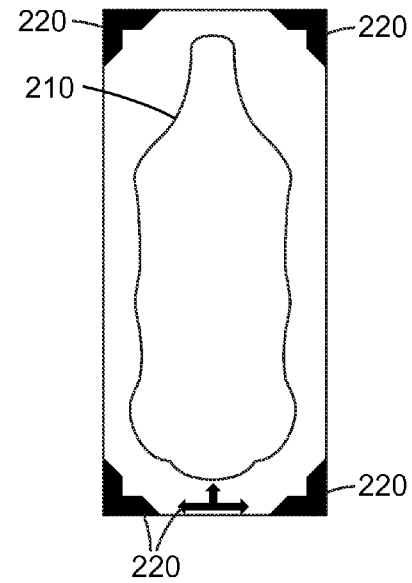

FIGS. 2A-2D illustrate exemplary configurations of a shaped projections screen 210 with alignment marks 220. In some cases, at least some of the alignment marks are proximate to the border of the projection screen, where the at least some of the alignment marks can be inside the border, on the border, and/or outside the border. In some implementations, these alignment marks 220 can be located on the projection screen 210, as illustrated in FIG. 2A. In some other implementations, as illustrated in FIG. 2B, these alignment marks 220 can be located in an area extended from the border of the shaped projection screen 210. For example, the alignment marks 220 can be on a removable liner that is temporally adhered to the projection screen 210 during installation or a permanent liner of the projection screen 210.

Figure 2C:
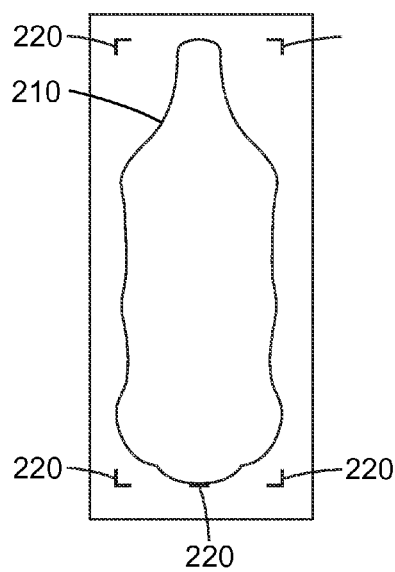
Figure 2D:
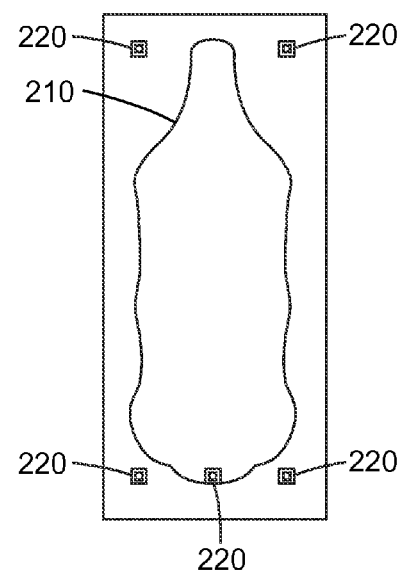

The alignment marks 220 can be virtual marks (i.e. as part of a projected image from the projector) or physical alignment marks. The physical alignment marks can be relatively small and inconspicuous or larger and more conspicuous. Additionally, the physical alignment marks can be visible or invisible. For example, the visible alignment marks can be made from retro-reflective materials, visible ink, or the like. As another example, the invisible alignment marks can be made using opaque ink, infrared ink, ultraviolet ink, or the like. In some implementations, the projection screen can have holes or other non-projection areas within its general shape. For example, a project screen in the shape of house can have windows that are non-projection areas. In such implementations, the system can include one or more alignment marks proximate to the non-projection area (i.e., close to its border or on its border, etc.) to aid the determination of the projection area. In some cases, the alignment marks 220 can be less conspicuous, as illustrated in FIG. 2C; and in some other cases, the alignment marks 220 can be more conspicuous, as illustrated in FIG. 2D. In some embodiments, all alignment marks 220 can have the same shape and sizes. In some other embodiments, at least one of the alignment marks 220 can have a specific shape and size to identify the relative position of the alignment mark to the projection screen 210 (e.g, upper left corner).

FIG. 1A illustrates a block diagram of an exemplary embodiment of a projection system 100A capable of automatic or semiautomatic projection alignment. The projection system 100A includes a projector 110, a shaped projection screen 120, one or more alignment marks 125, an image sensor 130, and a processing unit 140. The projector 110 is configured to project presentation content, such as static or animated images. The shaped projection screen 120 is configured to receive the projected image and display the projected image. At least one of the one or more alignment marks 125A is proximate to a border of the projection screen. The image sensor 130 is configured to capture an image of the shaped projection screen and the alignment mark and generate a sensor signal corresponding to the captured image. The processing unit 140 is electronically coupled to the image sensor 130 and configured to receive the sensor signal and determine the positions of the one or more alignment marks based on the sensor signal.

The projector 110 may be any suitable device configured to project an image onto projection screen 120, such as, but not limited to, a liquid crystal display (LCD) projector, a digital light processing (DLP) projector, a liquid crystal on silicon (LCOS) projector or a plasma projector. Other projectors may utilize surface-conduction electron-emitter display (SED) technology, organic light-emitted diode (OLED) technology, solid-state technology using lasers, and solid-state technology using light emitting diodes (LED). The projector 110 can be any suitable front-projection or rear-projection device. The projector 110 is configured to receive an input, such as a video signal from a video file, and project the corresponding image onto projection screen 120. The projector 110 may have any suitable display resolution, such as, but not limited to, display resolutions in accordance with the Super Video Graphics Array (SVGA) display standard (800×600 pixels), the eXtended Graphics Array (XGA) display standard (1024×768 pixels), the 720p display standard (1280×720 pixels) or the 1080p display standard (1920×1080 pixels).

The projectors for projecting the changeable electronic content can include mercury bulb based projectors (e.g., X56 projector from 3M Company, Saint Paul, Minn., U.S.A.), LED based projectors (e.g., MP410 projectors from 3M Company, Saint Paul, Minn., U.S.A.), laser based projectors, and hybrid projectors (e.g. XJ-M250 from Casio Computer Co., Ltd., Tokyo, Japan). In some systems, use of a laser based projector is advantageous because of its very long depth of focus, resulting in little degradation of the image quality from the top-to-bottom or side-to-side of the projected image and the high color gamut. In some systems, the use of a hybrid projector is advantageous because of the long life of the light source and the high color gamut.

The projection screen 120 may be any suitable projection screen that may be cut to define a particular shape prior to installation on a display surface, such as a window, door, or wall. The relative dimensions of the different sides of the projection screen 120 (e.g., an overall height and an overall width) may be selected based on the aspect ratio of the projector 110, as well as the pixel count of the projector 110.

While it is useful to cut a projection screen during or before installation to customize the projection screen for use with a particular shape of a window, such as a square, rectangular or circular window, projection screens having more unique shapes may also be useful. For example, a projection screen cut into a shape resembling a trademarked shape, such as a beverage bottle, may be more eye-catching than a rectangular shaped screen. A unique shape may add to the appeal of the projection screen 120 as well as the ability to captivate viewers. Other non-limiting examples of shapes of the projection screen 120 include silhouettes of characters, alphabetic letters, geometric patterns, logos, marquees, geometric shapes, thought bubbles, human figures, animal outlines, and product outlines. A product outline may include interior holes, such as the aforementioned bubbles which in turn have interior features.

In some implementations, a vector outline defined by a vector-based graphics software program may be used to define the boundaries of the projection screen 120 in order to extract (e.g., cut) the projection screen 120 from a sheet of optical film or otherwise create the projection screen 120 defining a customized shape. Any suitable software program executing on a computing device may be used to create the vector outline for defining the desired shape. Examples of suitable software programs include Adobe Photoshop, Adobe Flash, Adobe FreeHand, and Adobe Illustrator, which are each available from Adobe Systems Incorporated, San Jose, Calif. Further examples of suitable software programs for creating a vector image include CorelDRAW available from Corel Corporation, Ottawa, Canada and ConceptDraw available from Computer Systems Odessa, Odessa, Ukraine.

Vector images typically define a shape in computer graphics by geometrical primitives, such as lines, curves, points, polygons, and so forth. Vector images may provide certain advantages over raster-based images, such as an ability to be scaled without a loss of clarity. That is, a vector image may be scaled to substantially any size, large or small, without losing the clarity of the curves or other geometrical primitives defining the image. Thus, a vector image defining a shape for the projection screen 120 may be scaled to any size without losing the clarity of the outer boundaries of the projection screen 120. In contrast, raster images, which define a shape via a plurality of pixels, degrade in clarity upon scaling. Vector images may also be referred to as vector graphics, geometric modeling or object-oriented graphics.

In one embodiment, the projection screen 120 is a substantially flexible projection screen. For example, the projection screen 120 may be a flexible screen including refractive elements, such as glass beads, and a light absorbing layer for rendering the projection screen 120 substantially opaque in ambient lit conditions when no image is projected on the projection screen 120 by the projector 110. In some embodiments, the projection screen 120 is a rear projection screen in which the projector 110 projects an image onto a rear of the projection screen 120 and the image is viewable from a front surface of the projection screen 120, which is substantially opposite the rear surface. In other embodiments, the projection screen 120 is a front projection screen, in which the projector 110 projects an image onto the same surface as the viewing surface of the projection screen 120. Rear projection screens, including shaped screens, are described in the following, all of which are incorporated herein by reference as if fully set forth: U.S. Pat. No. 7,923,675; U.S. Pat. No. 6,870,670; and U.S. patent application Ser. No. 13/407,053, entitled "Shaped Rear Projection Screen with Shaped Fresnel Lens Sheet," and filed Feb. 28, 2012.

In general, a thinner projection screen 120 may be easier to cut into a customized shape than a thicker screen. Accordingly, in some embodiments, the projection screen 120 has a thickness less than or equal to about 1 millimeter (mm).

The image sensor 130 can include at least one of a camera, infrared camera, CCD (Charged Couple Device) array or the like. In some cases, the processing unit 140, also referred to as a processing system, can include one or more processors, microprocessors, microcontrollers, computers, or other computing devices. In such cases, the processing unit 140 can execute software or firmware stored in non-transitory computer-readable medium to implement automatic or semi-automatic alignment for the projection system 100. In some other cases, the processing unit 140 can include circuits to implement part of or all of the functionality of automatic or semiautomatic (i.e., including manual steps) alignment.

In some embodiments, the processing unit 140 is further configured to determine the general boundary of the shaped projection screen based on the sensor signal and a predetermined shape of the shaped projection screen. The predetermined shape can be stored in a data repository. In some embodiments, the processing unit 140 is further configured to determine the general boundary of the projection area on the shaped projection screen based on the sensor signal and a predetermined shape of the projection area. In some cases, the processing unit 140 is further configured to adjust presentation content based on the determined position of the alignment mark, the determined boundary of the shaped projection screen, and/or the determined boundary of the projection area. The adjusted content is provided to the projector 110 for projection Content, also referred to as presentation content or projection content, which is typically to be projected onto a projection screen, generally includes, for example, static image, video, interactive image or content, dynamic image or content, or the like.

In some embodiments, the projection system 100A can include more than one alignment mark 125, where the processing unit 140 is further configured to determine the positions of the one or more additional alignment marks and a rotation angle of the shaped projection screen. In some cases, the processing unit 140 is further configured to adjust the content based on the determined positions of the one or more alignment marks and the rotation angle of the shaped projection screen.

In some embodiments, the projector 110 has a projection area on the shaped projection screen, and the processing unit 140 is further configured to determine the positions of the one or more additional alignment marks and determine a scale (or zoom) factor, a metrics translation factor, and/or a rotation factor to be used to align the projection area with the shaped projection screen. In some implementations, the processing unit 140 is further configured to adjust presentation content based on the determined positions of the one or more alignment marks and the scale factor, the metrics translation factor, and/or the rotation factor. In some cases, the projector 110 can have more than one shaped projection areas. For each of the projection areas, a set of alignment factors can be determined and used to adjust presentation content.

In some embodiments, the projector 110 has a projection area on the shaped projection screen, and the processing unit 140 is configured to determine the positions of the one or more additional alignment marks and determine a keystone factor to be used to align the projection area with the shaped projection screen. In some implementations, the processing unit 140 is further configured to adjust presentation content based on the determined positions of the one or more alignment marks and/or the keystone factor. In some cases, the processing unit 140 is further configured to determine perspective projection factors (e.g., scale factor, orientation factor, rotation factor, etc.), image transformation (e.g., projection matrix), and/or projector setting adjustments. In some cases, the processing unit 140 is further configured to adjust the projector settings, and/or apply the image transformation and perspective projection factors to presentation content.

Figure 1B:
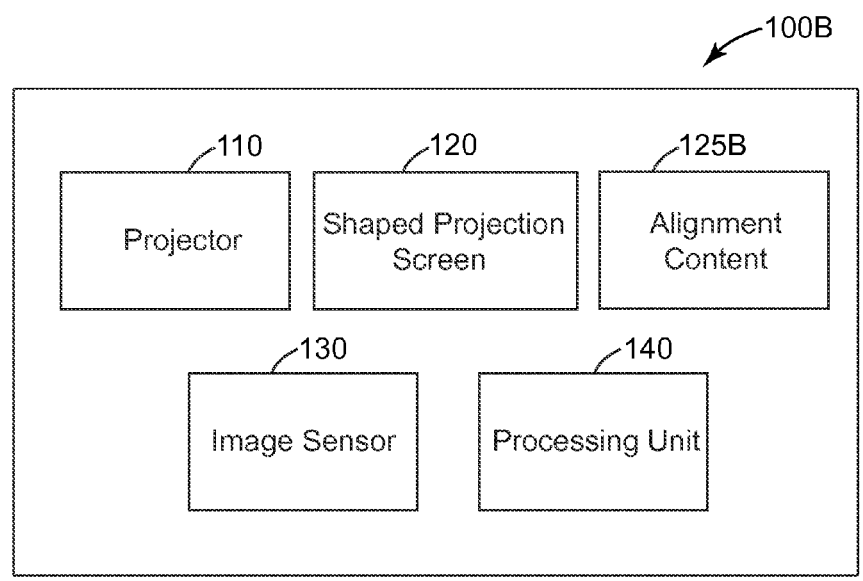
FIG. 1B illustrates a block diagram of another exemplary embodiment of a projection system capable of automatic or semiautomatic projection alignment.

FIG. 1B illustrates a block diagram of another exemplary embodiment of a projection system 100B capable of automatic or semiautomatic projection alignment. The projection system 100B includes a projector 110, a shaped projection screen 120, a series of alignment content 125B, an image sensor 130, and a processing unit 140. In some embodiments, the series of alignment content 125B may include more than one set of alignment content, each set of alignment content designed to discover the edge(s) of the shaped projection screen 120 along one direction. The projector 110 is configured to project the series of alignment content 125B toward the shaped projection screen. In some embodiments, at least part of the series of alignment images changes along a first direction. The image sensor 130 is configured to capture a series of projected alignment content and generate a series of sensor signals corresponding to the series of captured images. The processing unit 140 is electronically coupled to the image sensor 130 and configured to receive the series of sensor signals and determine the general boundary of the shaped projection screen based on the sensor signal. In some embodiments, the projection system can use both alignment marks and a series of alignment content to determine alignment factors and/or projective transformation.

Figure 10:
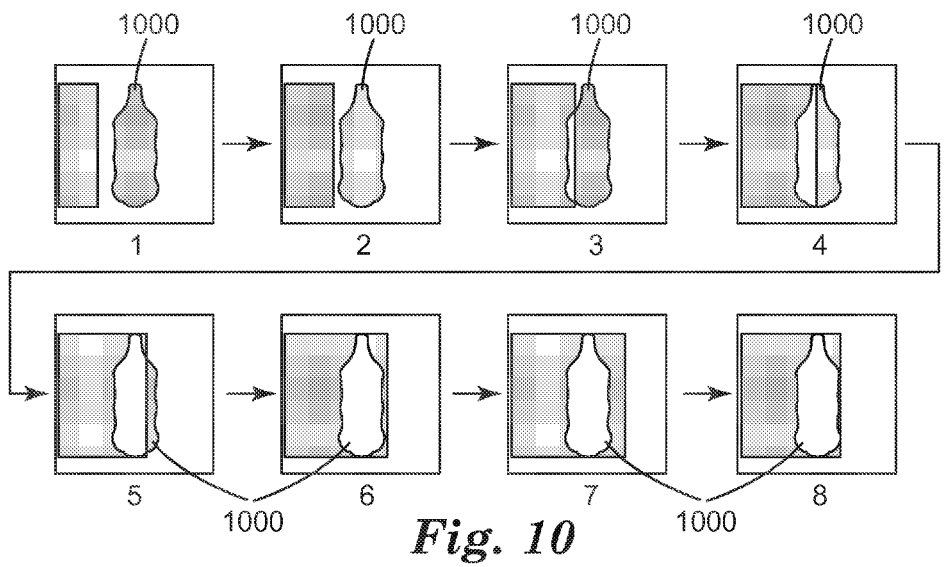
FIG. 10 illustrates an example of a set of alignment content.

In some cases, the series of alignment content include a set of still images that changes along a first direction. In such cases, at least part of the border of the shaped projection screen intersecting with the first direction can be determined by the processing unit, for example, by analyzing the intensity changes among the series of captured images. Further, after the general border of the shaped projection screen is identified, the process can be repeated with smaller changes within a certain area where the border locates to acquire a more accurate position of the border. FIG. 10 illustrates an example of a set of alignment content changes from left to right that is used to determine the general border and position of a shaped projection screen 1000. The alignment images 1-8 are increasing in size. Some of the alignment images (i.e., images 3-8) cover a part or all of a shaped projection screen 1000. The general border along the left to right direction can be determined by capturing the projected images. In some cases, after the right edge of the shaped projection screen 1000 is determined using alignment images 8 and 9, more alignment images with smaller changes can be used to determine the right edge more precisely.

In some embodiments, the series of alignment content include several set of alignment content to determine the relative location, orientation, rotation, and distortion of the shaped projection screen and compute alignment factors and/or projective transformation, where each set of alignment content changes along an individual direction. For example, the series of alignment content may include two sets of alignment content, where the first set of alignment content changes in a first direction and the second set of alignment content changes in a second direction orthogonal to the first direction. In some other cases, the series of alignment content 125B can vary in one or more patterns to aid the discovery. For example, a set of alignment content can use sweeping pattern of lines, boxes, or points to determine the relative location, orientation, rotation, and distortion of the shaped projection screen. Both positive images and negative images (inverted images) can be used as alignment content.

As an example, the projection system can use a set of alignment content with a pixel square (e.g., 1×1, 2×2, 3×3, etc.) sweeping across rows (e.g., from left to right) to determine edges of the projection screen. In some cases, the edges can be determined using brightness differencing. In addition, the projection system can use another set of alignment content with a pixel square sweeping across columns (e.g., from top to bottom) to refine the shape determination. Once the shape is defined, alignment factors and/or projective transformation can be mathematically derived by comparing the determined shape based upon the captured alignment content to the known designed shape of the projection screen. These alignment factors and/or projective transformation can be applied to a piece of presentation content either as it is projected, or as a separate step.

In some embodiments, a projection system can determine the alignment factors and/or projective transformation by analyzing a set of captured alignment content and a predetermined shape of the shaped projection screen. In some cases, only a portion of the border of the shaped projection screen needs to be determined to generate the alignment factors and/or projective transformation.

Figure 3A:
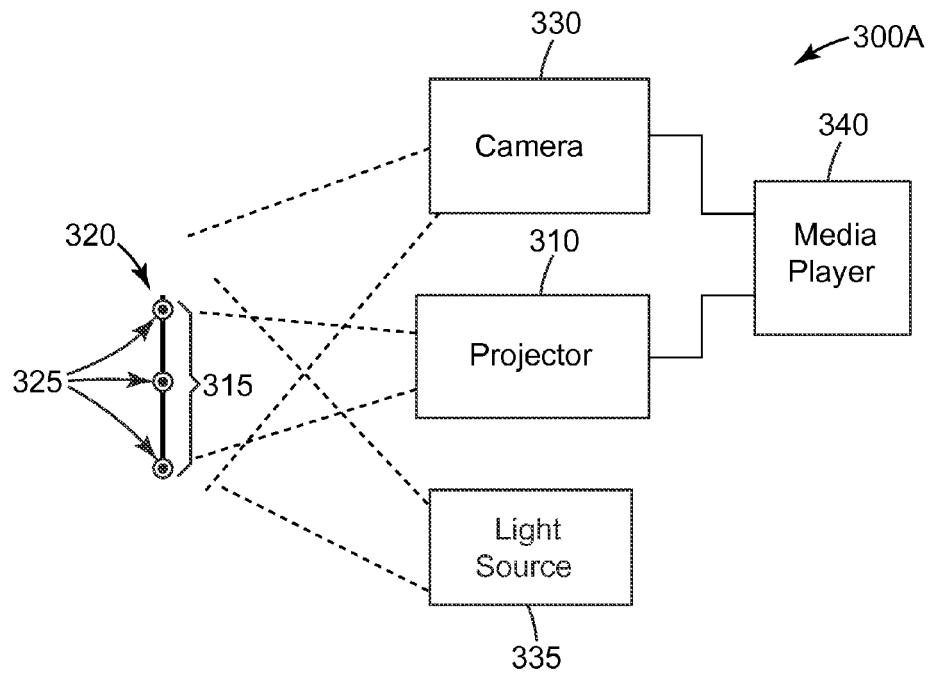
FIGS. 3A and 3B illustrate system diagrams of exemplary embodiments of a projection system capable of automatic or semiautomatic alignment.

FIG. 3A illustrates a system diagram of an exemplary embodiment of a projection system 300A capable of automatic or semiautomatic alignment. In some embodiments, the projection system 300A includes a projector 310, a projection screen 320, one or more alignment marks 325, a camera 330, and a media player 340 that has processing capability (i.e., includes processor(s) or other computing device(s)). The projector 310 has a projection area 315 on the projection screen 320. In some cases, the camera 330 captures the image of the projection screen 320 including content being presented on the screen and passes that information to the media player. In some implementations, the shape of the projection screen 320 is predetermined and the camera 330 only needs to capture a portion of the projection screen 320 with alignment marks 325. Alignment marks 325 can be visible marks, invisible marks, (e.g. infrared-ink marks, ultraviolet-ink marks, etc.), or a combination thereof. In some cases, a minimum of three alignment marks are necessary to determine the location of the projection screen 320 to adjust location, rotation, zoom, keystone etc. In some other cases, two alignment marks are necessary if only adjusting rotation, location and scaling. If the projection screen shape is not previously known, then the camera may capture the entire screen shape, calculate the screen shape and then locate alignment marks.

In some implementations, the camera 330 and the projector 310 can be contained in the same housing and use the same optical lens, so the camera 330 can capture image from the same location as the projector 310. In some other implementations, the camera 330 and the projector 310 can be set up at different housing or in the same housing but having separate optical lens. In a majority of implementations, the camera 330 may need to capture the location of the projected content so the relative alignment of the projector 310 and the projection screen 320 can be determined.

In some embodiments, the projection system 300A can include an optional light source 335 that can provide the necessary lighting to the alignment marks during the alignment process. The light source 335 can include infrared light source, ultraviolet light source, rapidly pulsed light source, and other suitable light source adequate to provide projection lights to illuminate the alignment marks 325.

The media player 340 provides content to the projector 310 for projection. The relative locations, rotations, orientations, and other presentation characteristics of the projector 310 from the projection screen 320 are analyzed and computed by a processing unit. In some embodiment, based on the computed presentation characteristics, presentation content is adjusted to properly project on to the shape projection screen by a processing unit. The content adjustment can include, for example, changing the size of content by applying a scale factor, or masking the portion of content outside the projection screen with black or other less visible pixels. The processing unit (not shown in FIG. 3) can include one or more processors that are hosted in the camera 330, the projector 310, the media player 340, and/or a separate device. In some cases, the processing unit can include one or more processors that are hosted in a remote device that can receive the captured image and other necessary information via a wired or wireless network.

In some implementations, the projection system 300A can modify the projection mount and configurations of the projector 310 to allow better alignment of the projector with the projection screen. For example, the projection system 300A can adjust the zoom and focus of the projector 310, and/or roll pitch and yaw of the projector mount. In some cases, the projection system 300A can run the alignment process upon installation and/or periodically (e.g., when the projector shuts down or powers on) to accommodate any relative motion between the projection screen 320 and the projector 310 that was induced, for example, during the preceding day.

Figure 3B:
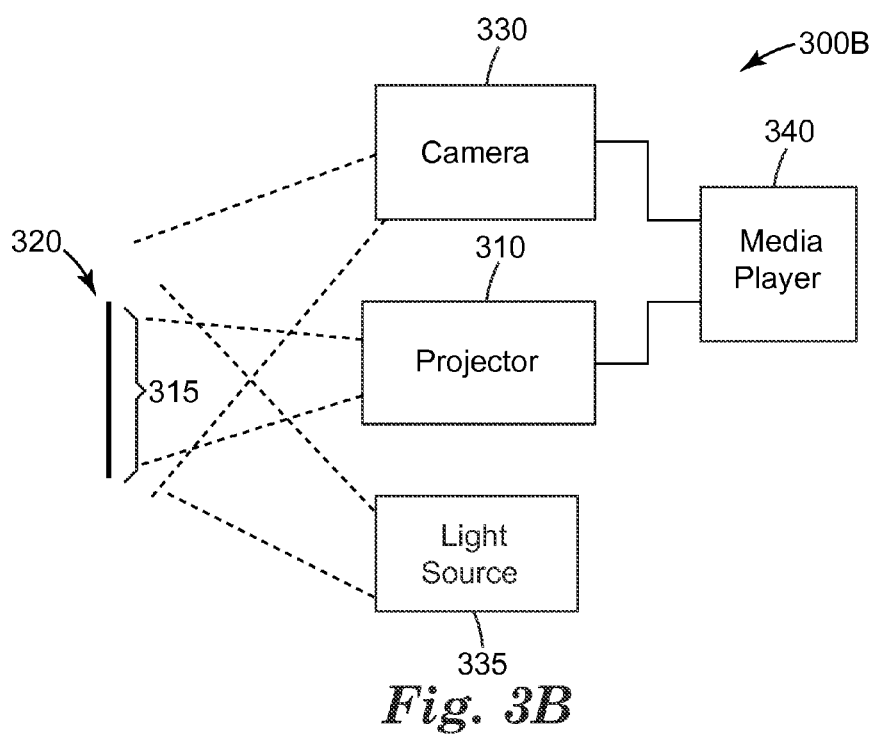

FIG. 3B illustrates a system diagram of another exemplary embodiment of a projection system 300B capable of automatic or semiautomatic alignment. In some embodiments, the projection system 300B includes a projector 310, a projection screen 320, a camera 330, and a media player 340 that has processing capability (i.e., includes processor(s) or other computing device(s)). The projector 310 has a projection area 315 on the projection screen 320. In some embodiments, the media player 340 provides a series of alignment content to the projector 310. In some cases, the camera 330 captures the image of the projection screen 320 including content being presented on the screen and passes that information to the media player 340. In some implementations, the media player 340 determines at least part of the general boundary of the projection screen 320 based on the series of captured alignment content and further generates alignment factors and/or projective transformation. In some implementations, the media player 340 uses the predetermined shape of the projection screen 320 to determine at least part of the general boundary of the shaped projection screen.

In some embodiments, the border of the projection screen can be outlined with some specific ink or materials (e.g., retro-reflective tape, infrared ink, etc.) to aid the border determination. In some embodiments, the projection system 300B can include an optional light source 335 that can provide the necessary lighting to the projection screen during the alignment process. The light source 335 can include infrared light source, ultraviolet light source, rapidly pulsed light source, and other suitable light source adequate to provide projection lights.

In some embodiments, at least some of the series of alignment content changes along a first direction, and at least part of general boundary of the shaped projection screen crosses the first direction. In some embodiments, at least some of the series of alignment content changes along a second direction different from the first direction, and at least part of general boundary of the shaped projection screen crosses the second direction. In some cases, the first direction is orthogonal to the second direction. In some embodiments, the media player 340 is further configured to adjust presentation content based on the at least part of the general boundary of the shaped projection screen and provide the adjusted presentation content to the projector. In some cases, the media player 340 may be configured to report to a content source the boundary information so that the content may be computationally adjusted for the measured boundary information and corrected content then supplied to the media player 340.

In some cases, the media player 340 is configured to determine one or more alignment factors based on the positions of at least part of the general boundary of the shaped projection screen. In such cases, the media player 340 is further configured to adjust presentation content based on the one or more alignment factors and provide the adjusted presentation content to the projector. Additionally, the media player 340 may adjust a projector setting based on the one or more alignment factors. In some cases, the media player 340 may be configured to report to a content source the alignment factors so that the content may be computationally adjusted for the measured alignment factors and corrected content then supplied to the media player 340.

In some cases, the media player 340 is configured to determine a projective transformation to be used to align the projection area with the shaped projection screen based on the at least part of the general boundary of the shaped projection screen. In such cases, the media player 340 is further configured to apply the projective transformation to presentation content and provide the adjusted presentation content to the projector. In some embodiments, the media player 340 may be configured to report to a content source the projective transformation information so that the content may be computationally adjusted for the measured projective transformation and corrected content then supplied to the media player 340.

In some cases, the media player 340 is configured to determine a keystone factor to be used to align the projection area with the shaped projection screen based on the at least part of the general boundary of the shaped projection screen. In such cases, the media player 340 is further configured to adjust presentation content based on the keystone factor and provide the adjusted presentation content to the projector. In some embodiments, the media player 340 may be configured to report to a content source the general boundary of the projection screen so that the content may be computationally adjusted for the measured general boundary of the projection screen and corrected content then supplied to the media player 340.

Figure 4:
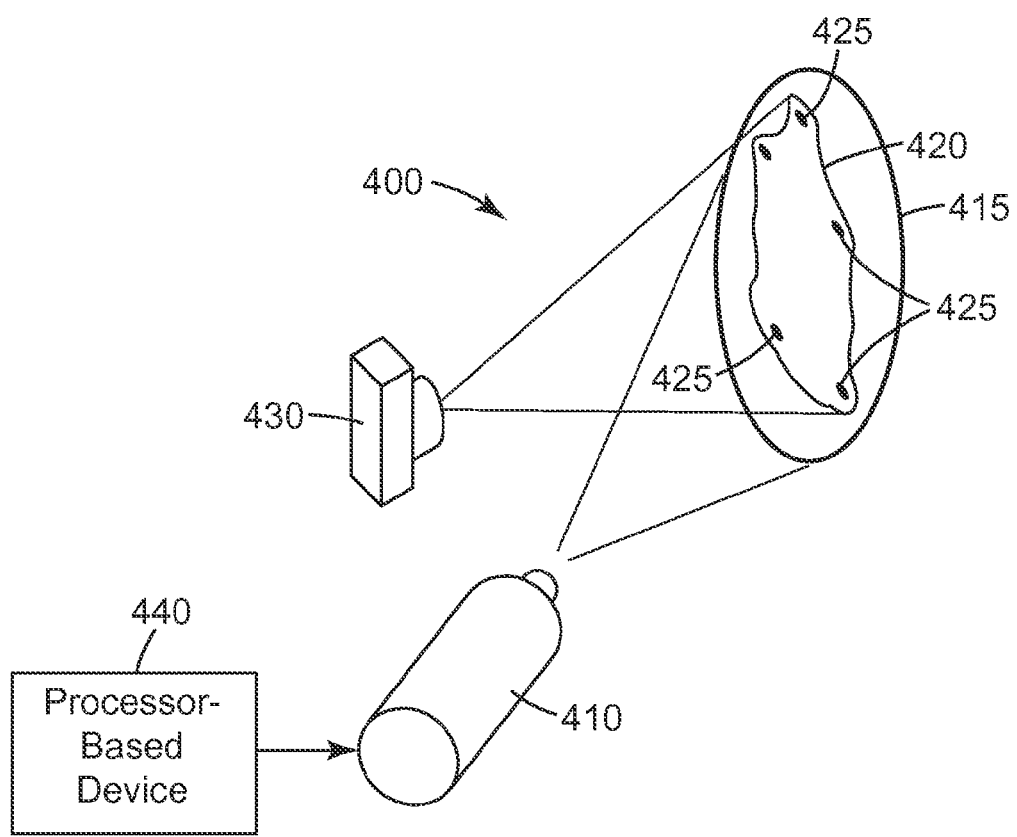
FIG. 4 illustrates a prospective view of one embodiment of a projection system capable of automatic or semiautomatic alignment.

FIG. 4 illustrates a prospective view of one embodiment of a projection system 400 capable of automatic or semiautomatic alignment. In this embodiment, the projection system 400 includes a projector 410, a shaped projection screen 420, an image sensor 430, and a processor-based device 440. Optionally, depending on the alignment technique, the projection system 400 may include one or more alignment marks 425. The projector 410 has a projection area 415 on the projection screen 420. In some implementations, the projection screen 420 can be a non-planar surface. The shaped projection screen 420 may be cut from an optical film or other material by hand or a machine, thermally formed, or made via other techniques. Regardless of whether the projection screen 420 is manually or automatically cut or formed, it may be desirable for the outer perimeter of the projection screen 420 to be substantially free of jagged edges in order to create the projection screen 420 with substantially clean edges. Substantially clean edges may be more aesthetically pleasing than jagged edges.

If the projection screen 420 is cut by a computer-controlled cutting machine, the cutting path for the machine may be based on a properly scaled virtual shape template. In one embodiment, the cutting machine is a computer numerically controlled (CNC) cutting machine employing a cutting tool to cut the projection screen film. The CNC cutting machine may be configured to move a cutting tool in two, three or more dimensions. In some embodiments, virtual shape template defines a cutting path for a computer-controlled cutting machine, such as by using a coordinates to indicate the linear path of cutting. In one type of CNC cutting machine, a controller, which may be provided by an external computing device or may be integral with the CNC cutting machine, generates signals indicative of the cutting path based on shape template. Based on the signals, the cutting tool of the cutting machine selectively cuts the projection screen material to produce the projection screen 420 defining a customized shape. The cutting machine may cut the projection screen 420 with a substantially continuous path in order to create a substantially clean edge.

After the projection screen 420 is cut to the desired shape, the projection screen 420 may be installed at the desired location. In some embodiments, the projection screen 420 is configured to be applied directly to an application surface. In the case of a rear projection screen, the application surface may be any suitable substantially transparent surface as long as the projection screen 420 is in a position capable of being viewed. The substantially transparent surface may comprise, for example, exterior or interior doors or windows. In some cases, substantially transparent surface may be somewhat opaque. For example, the surface may comprise a tinted, dirty or colored window, or it may comprise a window that has a wire pattern embedded in the glass. Alternatively, the projection screen 420 may include a stand that allows the projection screen 420 to be free-standing.

After the projection screen 420 is installed, the projector 410 may be positioned relative to the projection screen 420. Alternatively, if the projector 410 is in a fixed location, the projection screen 420 may be positioned relative to the projector 410. Precise and accurate placement of the projector 410 relative to the projection screen 420 is an important aspect to correctly projecting an image onto the projection screen 420 defining a customized shape. Due to the nature of the unique border of the projection screen 420, there may be less of a margin for misalignment between the projector 410 and the projection screen 420.

In some embodiments, in order to align the projector 410 and the projection screen 420, the projector 410 can project one or more alignment content onto the projection screen 420. The image sensor 430 can capture the projected alignment content and provide the captured alignment content to the processor-based device 440 for further analysis. In some embodiments, the processor-based device 440 determines projective transformation and/or alignment factors based on the captured alignment content that can be used to adjust the settings of the projector 410, adjust the relative position between the projector 410 and the projection screen 420, adjust presentation content, and/or mask presentation content. Virtual masking in projection systems are described in the following, all of which is incorporated herein by reference as if fully set forth: U.S. Pat. No. 7,923,675; U.S. Pat. No. 8,193,480.

In some implementations, the processor-based device 440 can be the same device as the image sensor 430 and/or projector 410 or hosted in the same housing as the projector 410 and/or image sensor 430. In some other implementations, the processor-based device 440 can be a different device from the image sensor 430 and the projector 410. In some cases, the processor-based device 440 can be located remotely and received the captured alignment content via a communication interface. Various components of the projection system, such as projector, image sensor, and processor-based device, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 5A:
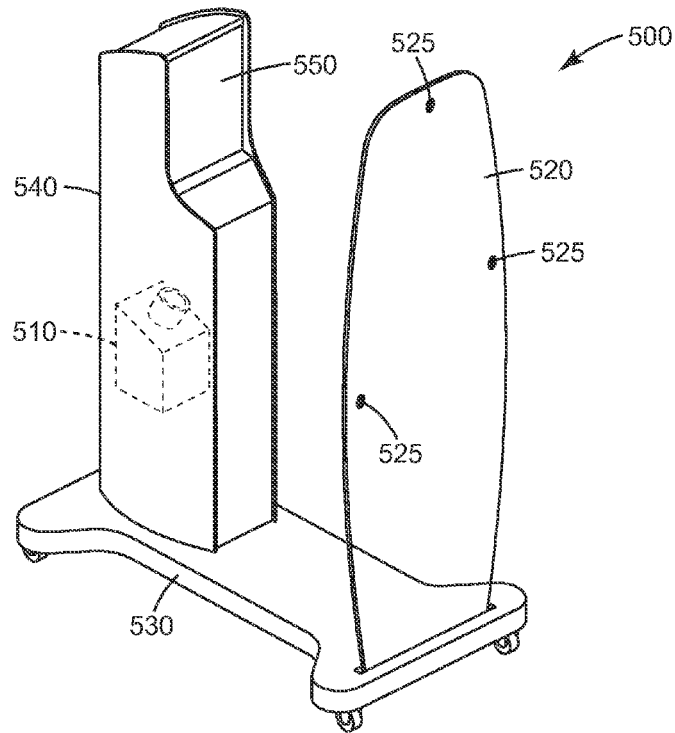
FIGS. 5A and 5B illustrates projection system including a frame.
Figure 5B:
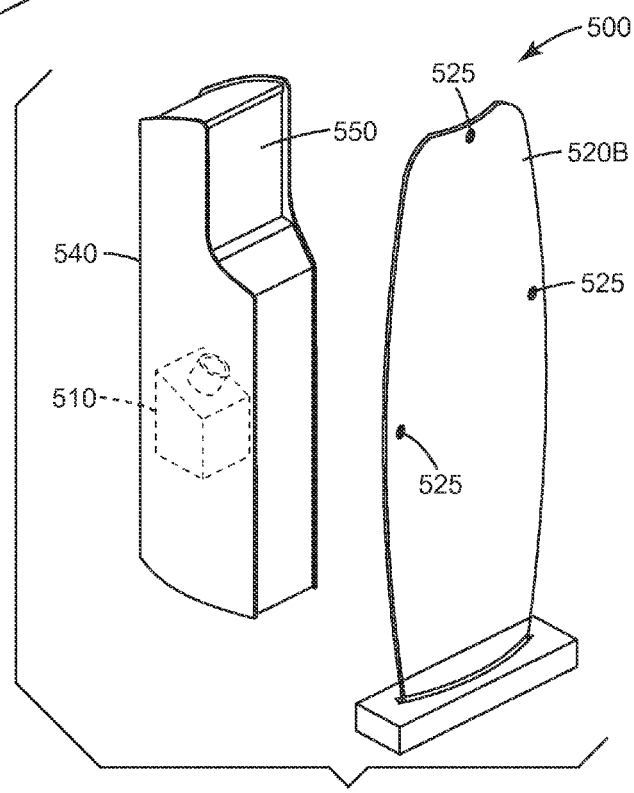

In some embodiments, as illustrated in FIG. 5A, a projection system 500 may include a frame 530 to provide mounting for a projection housing 540 and a projection screen 520. The projection housing includes a projector 510, a reflective screen (not shown in the figure), and a projection window 550. In some cases, the projection system 500 includes the optional alignment marks 525. In the cases of using alignment marks, a minimum of four non-uniform alignment marks (i.e., one or more marks have different sizes and/or shapes) or five uniform alignment marks are needed to determine the perspective projection factors. In such cases, the minimum number of alignment marks 525 needed to determine the perspective projection factors can be less if the positioning of the screen, e g. orientation and relative position to the projector, is specified at installation, trading off ease of installation for ease of alignment. In some embodiments, as illustrated in FIG. 5B, the projection screen 520B can have a non-planar surface (i.e., curved surface). In some cases, the projection system 500 includes the optional alignment marks 525. In some embodiments, if the three-dimensional (3D) shape of the projection screen 520B is known, the projection system 500 can determine the positions of the alignment marks 525 or at least a portion of the border of the projection screen 520B and then determine the alignment factors and/or projective transformation to be used for content or projector adjustment. If the 3D shape is not known in advance, the projection system 500 can segment the non-planar surface, so that the entire surface could be approximated by a set of subsurfaces which are planar and the alignment proceeds on the subsurfaces as discussed above.

Figure 6:
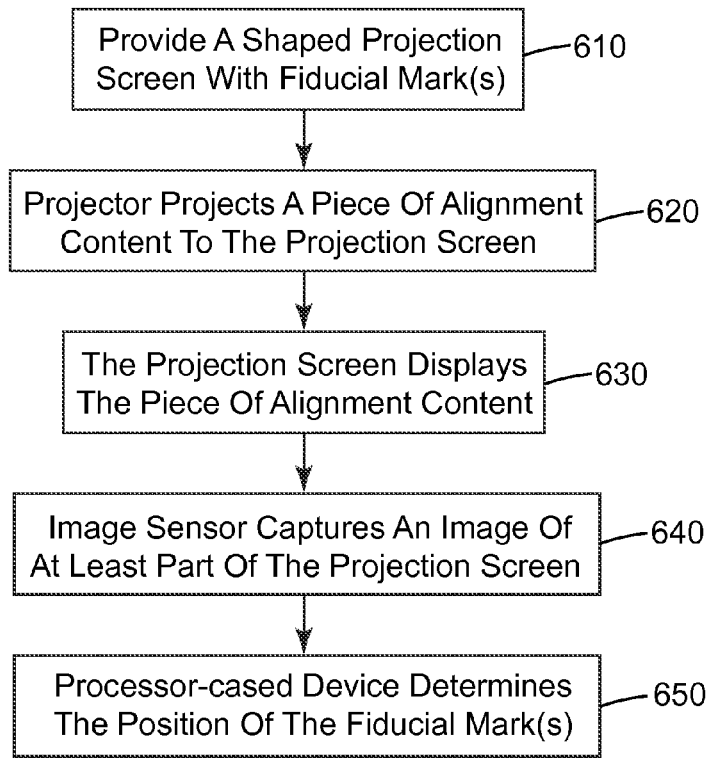
FIG. 6 illustrates an exemplary flow diagram for an alignment process used by a projection system.

FIG. 6 illustrates an exemplary flow diagram for an alignment process used by a projection system. Initially, one or more fiducial marks are provided proximate to a shaped projection screen (step 610). Next, the projector projects a piece of alignment content to the shaped projection screen (step 620). In some cases, the piece of alignment content can be a static image, a dynamic image, or a simple even or uneven lighting output. In some implementation, the projector may use a separate light source (e.g., infrared light source) when projecting the alignment content. Further, the shaped projection screen displays the piece of alignment content (step 630). An image sensor captures an image of at least part of the shaped projection screen when the piece of alignment content is displayed (step 640). In general, the captured image includes a visual representation of the fiducial mark. A processor-based device receives the captured image, analyzes the captured image, and determines the position of the fiducial mark(s) based on the captured image (step 650).

In some cases, the piece of alignment content is a blank page. In such cases, the image sensor may capture an image of at least part of the shaped projection screen when the piece of alignment content is not displayed as a second input to determine the position of the fiducial mark(s). Further, such approaches can reduce ambient light noise and/or baseline light level for the projection environment. In some other cases, the projector can project a first piece of alignment content and a second piece of alignment content to the projection screen sequentially; the image sensor captures a first image and a second image when the first and the second pieces of alignment content being projected respective; and the processor or the process-based device determines the position of the fiducial mark(s) based on the first image and the second image. For example, the first piece of alignment content and the second piece of alignment content can be designed to cover different areas of the projection screen (and its adjacent outer areas) and the fiducial mark(s) within those areas respectively.

Figure 7A:
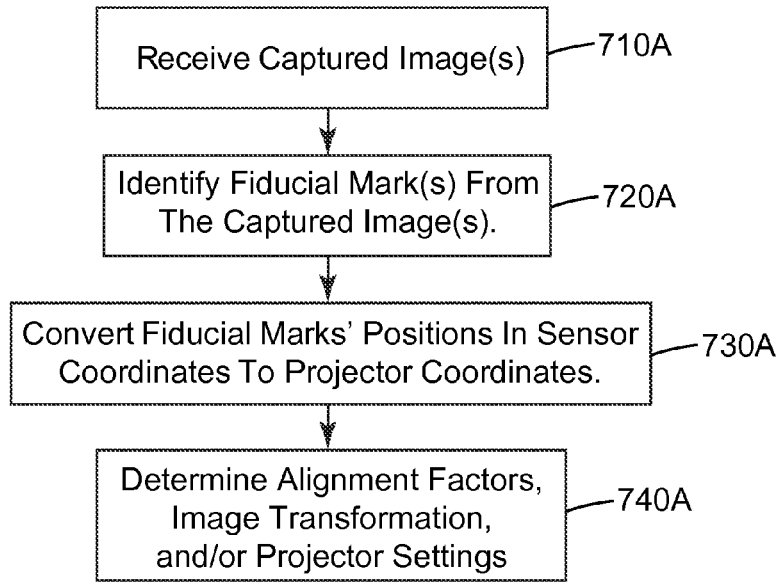
FIG. 7A illustrates an exemplary flowchart for the processor-based device in analyzing captured image(s) and determining alignment factors and/or projective transformation.

In some embodiments, the processor-based device may determine alignment factors based on the determined position of the fiducial mark(s). FIG. 7A illustrates an exemplary flowchart for the processor-based device in analyzing captured image(s) and determining alignment factors and/or projective transformation. First, the processor-based device receives captured image(s) (step 710A). Next, the processor-based device identifies fiducial marks from the captured image(s) (step 720A). Optionally, the processor-based device converts the position(s) of the fiducial mark(s) in sensor coordinates to projector coordinates (step 730A). The processor-based device computes alignment factors based on the fiducial marks' positions (step 740A). For example, perspective projection factors (e.g., orientation factor, location factor, scale factor, etc.) can be calculated by identifying four fiducial marks. In one embodiment, these four fiducial marks are non-uniform and can be identified uniquely from each other, indicating their relative positions and orientation. The four fiducial marks with known relative positions and orientations being identified in the captured image (e.g., the four corner points) are then compared to the known positions of the four fiducial marks in the ideal projection space and projective transformation (including orientation, approximate location, and scale, etc.) can be determined and applied to projection content such that the projection content can be aligned with the shaped projection screen when it is projected. The ideal projection space is referred to the projection space without any distortion or shifting. If the relative positions of the fiducial marks are unknown, in some cases, one or more fiducial marks are needed to identify the relative positions of these marks. For example, an additional fiducial mark may be required to determine factors such as relative orientation of the projector.

In some cases, the perspective transform or applying alignment factors may create distortion. In such cases, in order to compensate for this distortion, at least three fiducial marks of known relative positions can be used. The three fiducial marks with known relative positions are identified in the captured images. The positions of the three fiducial marks can be computed. Optionally, the positions of the three fiducial marks can be converted from sensor coordinates to projector coordinates. Using the positions of three fiducial marks, the processor-based device can calculate whether the projective distortion requires additional location compensation and by how much (i.e., distortion compensation factor(s)), in the projector coordinates.

In some cases, aspect-ratio compensation factors are needed to align projection content. In some embodiments, at least three alignment marks of known relative positions are needed. The three fiducial marks with known relative positions are identified in the captured images. The positions of the three fiducial marks can be computed. Optionally, the positions of the three fiducial marks can be converted from sensor coordinates to projector coordinates. Using the positions of three fiducial marks, the processor-based device can calculate the aspect ratio in the projection space. The processor-based device can then determine aspect-ratio compensation factors by comparing the aspect ratio of the projection space with the aspect ratio of the ideal projection space.

In some embodiments, the processor-based device determines a general boundary of the shaped projection screen based on a predetermined shape of the projection screen and the determined position of the fiducial mark(s) and further adjusts presentation content. In such embodiments, the predetermined shape of the projection screen can be stored in the format of, for example, file(s), data entry in database, or other suitable formats. The predetermined shape can be stored in a data repository. In some cases, the data repository may run on a single computer, a server, a storage device, a cloud server, or the like. In some other cases, the data repository may run on a series of networked computers, servers, or devices. In some implementations, the data repository includes tiers of data storage devices including local, regional, and central. In some embodiments, the alignment factors can be stored in the data repository.

Figure 7B:
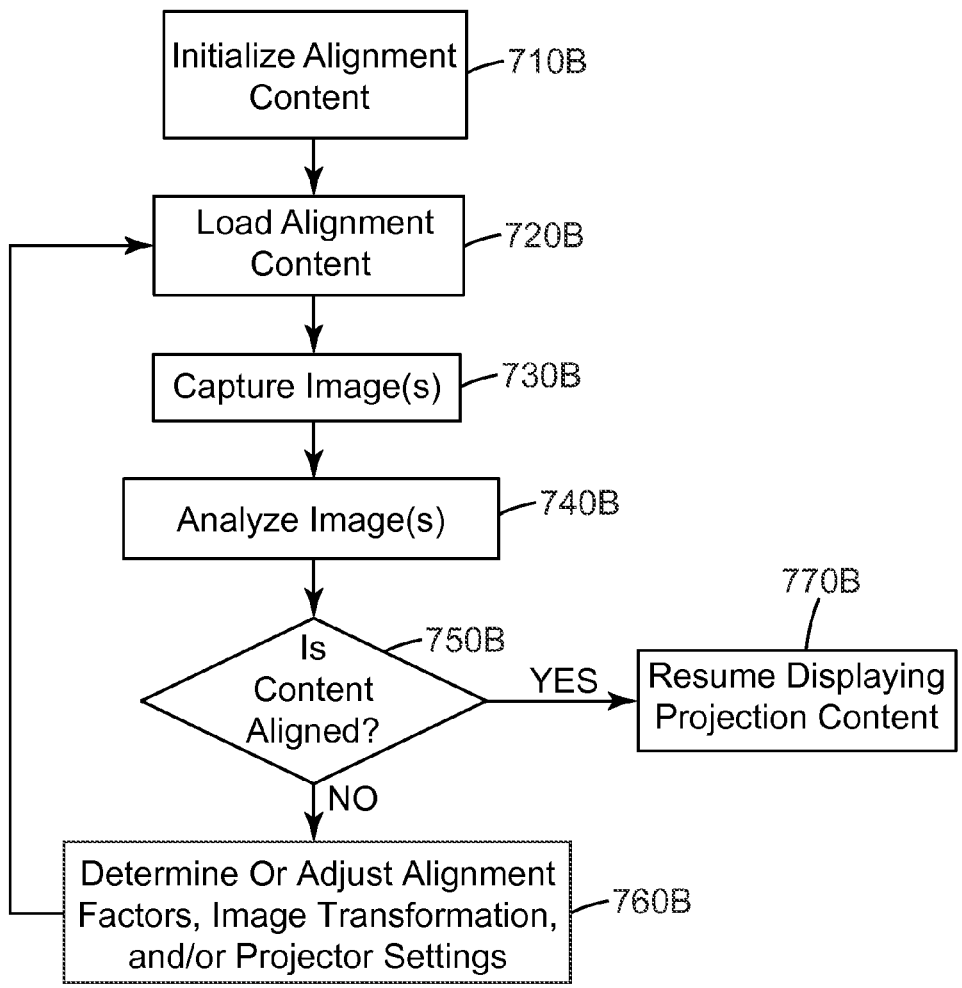
FIG. 7B illustrates an exemplary flowchart of a projection alignment process.

FIG. 7B illustrates an exemplary flowchart of a projection alignment process. The projection alignment process can be performed repetitively, for example, at projector power-on time, daily maintenance time, or on-demand. First, alignment content is initialized (step 710B). In some cases, the alignment content can be a blank content that introduces even projection light onto the projection screen. Next, the alignment content is loaded (step 720B) and projected by the projector. In some implementations, the projector may use a separate light source to project the alignment content. An image sensor (i.e., a camera) captures image(s) of the projection screen (step 730B). In some cases, the image sensor can capture two or more images of the projection screen to construct the three-dimensional (3-D) shape of the screen. Further, a processor or a processor-based device analyzes the captured images (step 740B) and determines whether the content is aligned (step 750B). If the content is not aligned, alignment factor(s), image transformation, and/or projector settings are determined or adjusted (step 760B) and the system verifies the alignment again, back to step 720B. For example, an image transformation matrix, also referred to as a projective transformation matrix, can be determined and/or adjusted, and then the image transformation matrix can be applied to projection content. In some cases, one or more of the projector settings (e.g., keystone factor, zoom, etc.) can be adjusted according to the determined values. If the content is aligned, the projector resumes displaying projection content (step 770B). In some embodiments, the projection system can mask the projection content that is outside the projection screen.

Figure 11:
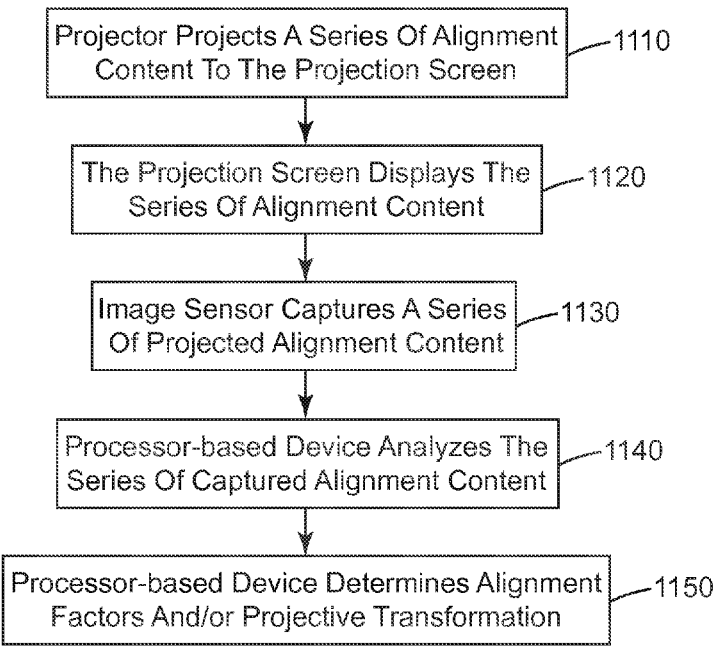
FIG. 11 illustrates an exemplary flow diagram for an alignment process for a projection system using a series of alignment content.

FIG. 11 illustrates an exemplary flow diagram for an alignment process for a projection system using a series of alignment content. The projector projects a series of alignment content to a projection area (step 1110), where at least part of a shaped projection screen is in the projection area.

In some embodiments, at least part of the series of alignment images changes along a first direction. The projection screen displays the series of alignment content (step 1120). The image sensor captures a series of projected alignment content (step 1130). A processor-based device analyzes the series of captured alignment content (step 1140). In some embodiments, the processor-based device determines at least part of the first border of the shaped projection screen based on the series of captured alignment content. In some embodiments, the first border intersects with the first direction. In some implementations, the processor-based device determines at least part of the first border of the shaped projection screen based on the intensity changes among the series of the captured alignment images. Further, as an optional step, the processor-based device determines alignment factors and/or projective transformation (step 1150).

In some embodiments, the projection system can adjust display content based on the at least part of the first border of the shaped projection screen and project the adjusted display content onto the shaped projection screen by a projector. In some cases, at least part of the series of the alignment images changes along a second direction different from the first direction and the processor-based device determines at least part of a second border of the shaped projection screen based on the series of the captured alignment content. In some cases, the second border intersects with the second direction. In one embodiment, the second direction is orthogonal to the first direction. The processor-based device may determine alignment factors and/or projective transformation based on both the at least part of the first border and the at least part of the second border.

In some embodiments, the processor-based device determines at least part of general boundary of the shaped projection screen based on the at least part of the first border and the at least part of the second border and further determines alignment factors and/or projective transformation based on the at least part of the general boundary of the shaped projection screen. The processor-based device can adjust presentation content by applying alignment factors and/or projective transformation, and provided the adjusted content to the projector. The projector then projects the adjusted presentation content to the shaped projection screen.

Figure 8:
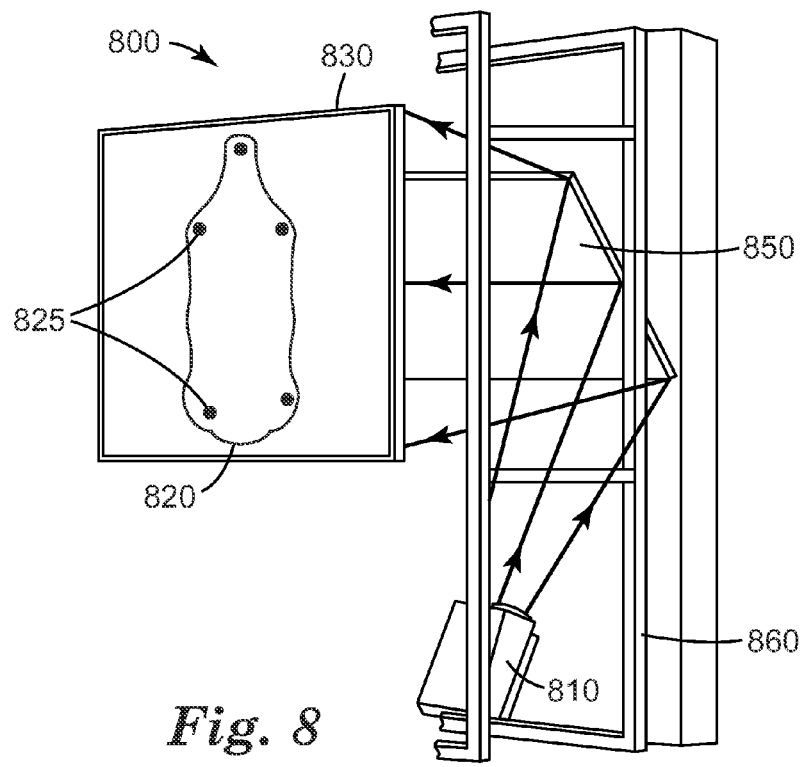
FIG. 8 is a schematic perspective view of another example of projection system.

FIG. 8 is a schematic perspective view of another example of projection system 800 that includes a shaped projection screen 820 with optional alignment marks 825 and a projector 810. In some cases, the projection screen 820 is coupled to a transparent surface 830 (e.g., a window). In some implementations, the projection system 800 can further include a reflective screen 850 (e.g., a mirror) and an adjustable frame and stand system 860. The adjustable frame and stand system 860 accommodates the use of different projectors 810 in the projection system 800. For example, an on-axis projector may be used with a first promotional campaign with a first screen 820 defining a first shape. Thereafter, the on-axis projector may be replaced with an off-axis projector for a second promotional campaign having different video requirements. If desired, the projection screen 820 may be replaced by another screen defining a different shape for the second promotion campaign. In some cases, the alignment marks 825 can be placed on the transparent surface 830. In such cases, the alignment marks 825 are the same while the projection screens 820 of different shapes are used.

Figure 9:
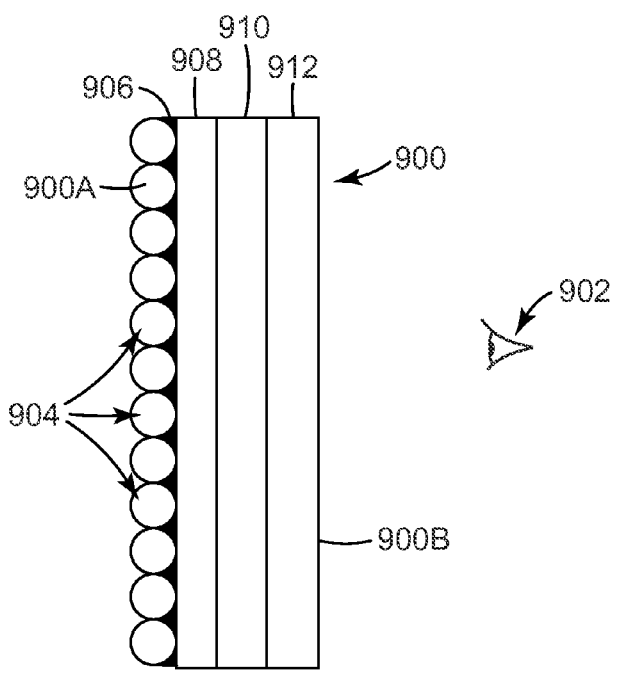
FIG. 9 is a schematic side view of projection screen that may be incorporated into projection systems.

FIG. 9 is a schematic side view of projection screen 900 that may be incorporated into projection systems. A viewing eye 902 is schematically shown in order to provide a reference point for identifying a rear side 900A of the projection screen 900, which faces away from viewing eye 902, and a front, viewing side 900B of the projection screen 900, which faces viewing eye 902. Front side 900B is on an opposite side of the projection screen 900 from the rear side 900A (also referred to as a "back side").

The projection screen 900 includes a plurality of refractive elements 904 (e.g., glass beads), light absorbing layer 906, light transmitting substrate 908, removable adhesive 910, and liner 912. In one embodiment, refractive elements 904 are situated in substantially predetermined positions. However, manufacturing and cost limitations may limit the precision of the placement of refractive elements 904. For example, refractive elements 904 may be placed in an array, a closely or loosely packed arrangement.

Refractive elements 904 may be constructed from glass or polymeric materials. Suitable examples include glass or a transparent plastic material. Projections screens including refractive beads and construction of such screens may comprise the teachings disclosed in commonly assigned patent applications PCT WO 99/50710 and PCT WO 98/45753, and U.S. Pat. No. 6,466,368, issued Oct. 15, 2002, and entitled "REAR PROJECTION SYSTEM WITH REDUCED SPECKLE," and U.S. Pat. No. 6,535,333, issued Mar. 18, 2003, entitled "OPTICAL SYSTEM WITH REDUCED COLOR SHIFT", U.S. Pat. No. 6,631,030, issued Oct. 7, 2003, and entitled "PROJECTION SCREENS AND METHODS FOR MAKING SUCH PROJECTION SCREENS," and U.S. Pat. No. 6,204,971, issued Mar. 20, 2001 and entitled "GLASS MICROSPHERES FOR USE IN FILMS AND PROJECTION SCREEN DISPLAYS AND METHODS" (the entire contents of each of which are herein incorporated by reference).

In one embodiment, refracting elements 904 are transparent, substantially spherical, refracting beads seated in an absorptive, high optical density transparent polymer matrix. The beads may be in intimate contact with a transparent binder material. The beads may have a refractive index between about 1.2 and 1.9. In some embodiments, the spherical beads have an average diameter of greater than about 20 micrometers (μm) and less than about 400 μm. For example, the average diameter may be between about 40 μm and about 90 μm. As another example, the average diameter of the refractive beads may be is a range of about 50 μm and about 80 μm. In one embodiment, the average diameter of each spherical refractive bead is about 65 μm.

The projection screen 9100 including refractive beads (i.e., a "beaded screen") affords a relatively good contrast and a viewing angle that allow a bright, sharp picture to be viewed at wide angles while minimizing any losses in image quality due to washout from sunlight or room lighting. Beaded screens may be constructed to provide substantially symmetric horizontal and vertical viewing angle and gain characteristics. This may be particularly useful for large screens used in multilevel locations (such as shopping malls) where a person located on a level above or below the screen may wish to view the screen. Also, beaded screens may be constructed to be flexible so that they can be easily mounted to any rigid, transparent surface minimizing surface reflection losses that might be present with a conventional rigid rear projection screen.

As used herein, the viewing angle means the angle at which gain is reduced by 50% of the peak value. To determine viewing angle, screen gain is tested. Gain is a measure of screen brightness and a function of viewing angle. It is normalized with respect to a Lambertian diffuser. To measure gain, a white light source illuminates a white reflectance standard. Its luminance is measured with a luminance meter at near normal incidence ($L_R$). A screen is placed in front of the light source and the luminance is measured (on the opposite side of the sample from the source) at near normal incidence ($L_S$). The peak gain is defined as the ratio of $L_S/L_R$. After the on-axis gain measurement, the screen then stepped through a range of angles, a luminance reading taken at each position. $L_S$–$\theta/L_R$ (Gain) is then plotted as a function of angle. The viewing angle is defined as the angle at which the gain falls to one-half its peak value.

When beaded rear projection screens are used for displays, it has been found that in some situations, a wider viewing angle is desired, while in other situations, a narrower viewing angle may be preferred. Lower refractive indices for the beads tend to narrow the viewing angle, but provide a brighter image to viewers located within the area defined by the maximum viewing angle. For this reason, it is useful to be able to provide a variety of different screens for different situations. Use of different beads for different screens affords this flexibility in screen design.

In one embodiment, light absorbing layer 906 may be coated on or otherwise coupled to light transmitting substrate 908. In another embodiment, light transmitting substrate 908 may be applied onto light absorbing layer 906. Light absorbing layer 906 helps controls ambient light rejection for an optical system. As a result of light absorbing layer 906, screen 900 supplies excellent contrast characteristics, even in relatively high ambient lighting conditions, as compared to screens that do not include a light absorbing layer 906.

Light absorbing layer 906 may be opaque or substantially opaque. In embodiments, light absorbing layer 906 includes one or more of a powder coating of carbon black, a black dye, an opaque particle, an organic or inorganic pigment or particle, or such a particle dispersed in a binder material. The particles that define light absorbing layer 906 may be of a wide variety and shapes. For example, the material may be dispersed in a liquid or solid binder system. In one embodiment, light absorbing layer 906 comprises a clear binder having black particles dispersed throughout the clear binder. The binder may comprise, for example, an acrylate or other UV curable polymer. Light absorbing layer 906 may be applied by a conventional technique such as a coating process or powder coating.

Light transmitting substrate 908 is substantially flexible to help render screen 900 substantially flexible. Light transmitting substrate 908 is also substantially transparent or translucent. For example, a substantially flexible and substantially transparent substrate 908 may comprise suitable light transmitting materials such as polyvinyl chloride, acrylic, polycarbonate or combinations of such materials. Light transmitting substrate 908 may include an optional matte anti-glare finish, such as a finish achieved by embossing.

Removable adhesive 910 couples screen 900 to an application surface, such as transparent surface 830 of FIG. 8. Removable adhesive 910 permits screen 900 to be removed from an application surface without substantially damaging the application surface or leaving undue adhesive residue behind on the application surface. In some embodiments, removable adhesive 910 is also a repositionable adhesive, which allows screen 900 to be moved relative to the application surface without completely removing screen 900 from the application surface. For example, screen 900 may be slidable relative to the application surface prior to applying pressure to adhesive layer 910 (i.e., by applying pressure to screen) to substantially secure screen 900 to the application surface.

Removable adhesive 910 may be an optical adhesive, such as the ones described PCT WO 97/01610 (the entire contents of which are herein incorporated by reference). In some embodiments, removable adhesive 910 may be reusable or repositionable. Other examples of suitable adhesives 910 include strong, tacky adhesives such as acrylic adhesives available from 3M Company of St. Paul, Minn. and Ashland Chemical Company of Columbus, Ohio (such as Aroset branded acrylics), and those constructions disclosed in U.S. Pat. No. 5,196,266 and PCT Patent Publication WO94/21742. Nonlimiting examples of other pressure sensitive adhesives 910 can generally be found in Satas, Ed., *Handbook of Pressure Sensitive Adhesives*, $2^{nd}$ Ed. (Von Reinhold Nostrand 1989). Of these adhesives, desirable adhesives include solvent-based acrylic and rubber adhesives, water-based acrylic adhesives, hot melt adhesives, microsphere-based adhesives, and silicone-based adhesives, regardless of their method of preparation.

Other nonlimiting examples of suitable adhesives 910 include acrylic adhesives from 3M Company and Ashland Chemical Co. and a nontacky adhesive, such as a terpolymer of acrylonitrile, butadiene, and isoprene, or similar copolymer of acrylonitrile and either butadiene or isoprene, commercially available under the brand Nipol adhesives from Zeon Chemical Co., Louisville, Ky. and those adhesives disclosed in EPO Patent Publication EP 0 736 585 (Kreckel et al.). Suitable acrylic adhesives having permanently low tack include microsphere-based adhesives disclosed in U.S. Pat. No. 5,141,790 (Calhoun et al.); U.S. Pat. No. 5,296,277 (Wilson et al.); U.S. Pat. No. 5,362,516 (Wilson et al.) and EPO Patent Publication EP 0 570 515 B1 (Steelman et al.), which are each incorporated herein by reference in their entireties.

Coating weights of adhesive 910 can range from about 10 micrometers (μm) to about 300 μm, such as about 20 μm to about 250 μm. Percent solids of such adhesives in the formulations to be applied on layer range from about 5% to about 100%, such as about 20% to about 100%. Adhesive 910 may be applied using a variety of techniques known to those skilled in the art such as casting, extruding, coating, spraying, screen-printing and laminating.

In some embodiments, the refractive index of adhesive 910 is between about 1.40 and 1.9, such as between 1.4 and 1.55. The index of refraction of adhesive 910 may be similar to the index of refraction of the substrate 908 so that a minimum amount of scattering occurs. Scattering may reduce the brightness or other optical properties of screen 900. In one embodiment, the difference in the indexes of refraction of substrate 908 and screen 910 is less than about 0.15, such as less than about 0.1. Alternatively, other factors may be varied to achieve the desired effect.

Other projection screens may be incorporated into a projection system of the present invention. For example, other projection screens described in commonly-assigned U.S. Pat. No. 6,870,670, entitled, "SCREENS AND METHODS FOR DISPLAYING INFORMATION," which was previously incorporated by reference, may be used in other embodiments.

The projection systems described herein are useful for many different applications. Examples of methods of providing information to a potential customer according are described in U.S. Pat. No. 6,870,670, entitled, "SCREENS AND METHODS FOR DISPLAYING INFORMATION." Also described in U.S. Pat. No. 6,870,670 are various networks that may be utilized to display information via a projection screen. Those networks may also utilize a projection system including a projection system described herein.

Exemplary Embodiments

Embodiment one is a projection system capable of projection alignment, comprising: a shaped projection screen, a projector configured to project a series of alignment content to the shaped projection screen, the projector having a projection area on the shaped projection screen, an image sensor configured to capture a series of projected alignment content, and a processing unit electronically coupled to the image sensor and configured to receive the series of captured alignment content and determine at least part of general boundary of the shaped projection screen based on the series of captured alignment content.

Embodiment Two is the projection system of Embodiment One, wherein at least some of the series of alignment content change along a first direction, and wherein the at least part of general boundary of the shaped projection screen crosses the first direction.

Embodiment Three is the projection system of Embodiment One or Embodiment Two, wherein at least some of the series of alignment content change along a second direction different from the first direction, and wherein the at least part of general boundary of the shaped projection screen crosses the second direction.

Embodiment Four is the projection system of Embodiment Three, wherein the first direction is orthogonal to the second direction.

Embodiment Five is the projection system of any of the Embodiment One through Embodiment Four, wherein the processing unit is further configured to adjust presentation content based on the at least part of the general boundary of the shaped projection screen and provide the adjusted presentation content to the projector.

Embodiment Six is the projection system of any of the Embodiment One through Embodiment Five, wherein the processing unit is further configured to determine an alignment factor based on the positions of at least part of the general boundary of the shaped projection screen.

Embodiment Seven is the projection system of Embodiment Six, wherein the processing unit is further configured to adjust presentation content based on the alignment factor and provide the adjusted presentation content to the projector.

Embodiment Eight is the projection system of Embodiment Six, wherein the processing unit is further configured to adjust a projector setting based on the alignment factor.

Embodiment Nine is the projection system of any of the Embodiment One through Embodiment Eight, wherein the processing unit is further configured to determine a projective transformation to be used to align the projection area with the shaped projection screen based on the at least part of the general boundary of the shaped projection screen.

Embodiment Ten is the projection system of Embodiment Nine, wherein the processing unit is further configured to apply the projective transformation to presentation content and provide the adjusted presentation content to the projector.

Embodiment Eleven is the projection system of any of the Embodiment One through Embodiment Ten, wherein the processing unit is further configured to determine a keystone factor to be used to align the projection area with the shaped projection screen based on the at least part of the general boundary of the shaped projection screen.

Embodiment Twelve is the projection system of Embodiment Eleven, wherein the processing unit is further configured to adjust presentation content based on the keystone factor and provide the adjusted presentation content to the projector.

Embodiment Thirteen is the projection system of any of the Embodiment One through Embodiment Twelve, wherein the image sensor comprises at least one of a camera, infrared camera, and CCD (Charged Couple Device) array.

Embodiment Fourteen is a method of alignment for a projection system, comprising: projecting a series of alignment content by a projector to a projection area on a shaped projection screen, at least part of the series of alignment images changing along a first direction, wherein at least part of the shaped projection screen is in the projection area; capturing, by an image sensor, a series of projected alignment content; and determining, by a processing system, at least part of a first border of the shaped projection screen based on the series of the captured alignment images.

Embodiment Fifteen is the method of Embodiment Fourteen, wherein at least part of the first border of the shaped projection intersects with the first direction.

Embodiment Sixteen is the method of Embodiment Fourteen or Embodiment Fifteen, wherein the determining step comprises determining at least part of the first border of the shaped projection screen based on the intensity changes among the series of the captured alignment images.

Embodiment Seventeen is the method of any one of the Embodiment Fourteen through Embodiment Sixteen, further comprising:
adjusting, by the processing system, display content based on the at least part of the first border of the shaped projection screen; and
projecting, by the projector, the adjusted display content onto the shaped projection screen.

Embodiment Eighteen is the method of any one of the Embodiment Fourteen through Embodiment Seventeen, further comprising: determining, by the processing system, a general boundary of the shaped projection screen based on the at least part of the first border and a predetermined shape of the shaped projection screen.

Embodiment Nineteen is the method of Embodiment Eighteen, further comprising: adjusting, by the processing system, a display content based on the general boundary of the shaped projection screen; and projecting, by the projector, the adjusted display content onto the shaped projection screen.

Embodiment Twenty is the method of any one of the Embodiment Fourteen through Embodiment Nineteen, further comprising: determining, by the processing system, at least part of a second border of the shaped projection screen based on the series of the captured alignment images, wherein at least part of the series of the alignment images changes along a second direction different from the first direction, and wherein the second border intersects with the second direction.

Embodiment Twenty-one is the method of Embodiment Twenty, wherein the second direction is orthogonal to the first direction.

Embodiment Twenty-two is the method of Embodiment Twenty, further comprising: determining, by the processing system, at least part of general boundary of the shaped projection screen based on the at least part of the first border and the at least part of the second border.

Embodiment Twenty-three is the method of any one of the Embodiment Fourteen through Embodiment Twenty-two, further comprising: determining, by the processing system, an alignment factor based on the at least part of the general boundary of the shaped projection screen.

Embodiment Twenty-four is the method of Embodiment Twenty-three, further comprising: adjusting, by the processing system, presentation content based on the alignment factor; and projecting, by the projector, the adjusted presentation content to the shaped projection screen.

Embodiment Twenty-five is the method of Embodiment Twenty-three, further comprising: adjusting, by the processing system, is further configured to a projector setting based on the alignment factor.

Embodiment Twenty-six is the method of any one of the Embodiment Fourteen through Embodiment Twenty-five, further comprising: determining, by the processing system, a projective transformation to be used to align the projection area with the shaped projection screen based on the at least part of the general boundary of the shaped projection screen.

Embodiment Twenty-seven is the method of Embodiment Twenty-six, further comprising: applying, by the processing system, the projective transformation to presentation content; and projecting, by the projector, the adjusted presentation content to the shaped projection screen.

Embodiment Twenty-eight is the method of any one of the Embodiment Fourteen through Embodiment Twenty-seven, further comprising: determining, by the processing system, a keystone factor to be used to align the projection area with the shaped projection screen based on the at least part of the general boundary of the shaped projection screen.

Embodiment Twenty-nine is the method of Embodiment Twenty-eight, further comprising: adjusting, by the processing system, presentation content based on the keystone factor; and projecting, by the projector, the adjusted presentation content to the shaped projection screen.

Embodiment Thirty is the method of any one of the Embodiment Fourteen through Embodiment Twenty-nine, wherein the image sensor comprises at least one of a camera, infrared camera, and CCD (Charged Couple Device) array.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

The invention claimed is:

1. A projection system capable of projection alignment, comprising:
a non-rectangular shaped projection screen,
a projector configured to project a series of alignment content to the non-rectangular shaped projection screen, the projector having a non-rectangular projection area on the non-rectangular shaped projection screen,
an image sensor configured to capture a series of projected alignment content, and
a processing unit electronically coupled to the image sensor and configured to receive the series of captured alignment content and determine at least part of general boundary of the non-rectangular shaped projection screen based on the series of captured alignment content,
wherein the projection system can reshape projected presentation content based on feedback from the image sensor to ensure projected presentation content falls within the general boundary of the projection screen.

2. The projection system of claim 1, wherein at least some of the series of alignment content change along a first direction, and wherein the at least part of general boundary of the non-rectangular shaped projection screen crosses the first direction.

3. The projection system of claim 2, wherein at least some of the series of alignment content change along a second direction different from the first direction, and wherein the at least part of general boundary of the non-rectangular shaped projection screen crosses the second direction.

4. The projection system of claim 1, wherein the processing unit is further configured to adjust presentation content based on the at least part of the general boundary of the non-rectangular shaped projection screen and to provide the adjusted presentation content to the projector.

5. The projection system of claim 1,
wherein the processing unit is further configured to determine an alignment factor based on the positions of at least part of the general boundary of the non-rectangular shaped projection screen.

6. The projection system of claim 5,
wherein the processing unit is further configured to adjust presentation content based on the alignment factor and provide the adjusted presentation content to the projector.

7. The projection system of claim 5,
wherein the processing unit is further configured to adjust a projector setting based on the alignment factor.

8. The projection system of claim 1,
wherein the processing unit is further configured to determine a projective transformation to be used to align the projection area with the non-rectangular shaped projection screen based on the at least part of the general boundary of the non-rectangular shaped projection screen.

9. The projection system of claim 8,
wherein the processing unit is further configured to apply the projective transformation to presentation content and provide the adjusted presentation content to the projector.

10. A method of alignment for a projection system, comprising:
projecting a series of alignment content by a projector to a non-rectangular projection area on a non-rectangular shaped projection screen, at least part of the series of alignment images changing along a first direction, wherein at least part of the non-rectangular shaped projection screen is in the projection area;
capturing, by an image sensor, a series of projected alignment content; and
determining, by a processing system, at least part of a first border of the non-rectangular shaped projection screen based on the series of the captured alignment images;
reshaping, by the projection system projected presentation content based on feedback from the image sensor to ensure projected presentation content falls within the general boundary of the projection screen.

11. The method of claim 10, further comprising:
adjusting, by the processing system, display content based on the at least part of the first border of the non-rectangular shaped projection screen; and
projecting, by the projector, the adjusted display content onto the non-rectangular shaped projection screen.

12. The method of claim 10, further comprising:
determining, by the processing system, at least part of a second border of the non-rectangular shaped projection screen based on the series of the captured alignment images,
wherein at least part of the series of the alignment images changes along a second direction different from the first direction, and wherein the second border intersects with the second direction.

13. The method of claim 12, further comprising:
determining, by the processing system, at least part of general boundary of the non-rectangular shaped projection screen based on the at least part of the first border and the at least part of the second border.

14. The method of claim 10, further comprising:
determining, by the processing system, a projective transformation to be used to align the projection area with the non-rectangular shaped projection screen based on the at least part of the general boundary of the non-rectangular shaped projection screen.

15. The method of claim 14, further comprising:
applying, by the processing system, the projective transformation to presentation content; and
projecting, by the projector, the adjusted presentation content to the non-rectangular shaped projection screen.

* * * * *